United States Patent [19]

Chou et al.

[11] Patent Number: 5,591,819

[45] Date of Patent: *Jan. 7, 1997

[54] ALDIMINE OXAZOLIDINES AND POLYISOCYANATES

[75] Inventors: Chih-Yueh Chou, Elk Grove; Marina D. Hoffman, Cary, both of Ill.

[73] Assignee: Angus Chemical Company, Buffalo Grove, Ill.

[*] Notice: The term of this patent shall not extend beyond the expiration date of Pat. No. 5,466,769.

[21] Appl. No.: 321,227

[22] Filed: Oct. 11, 1994

Related U.S. Application Data

[63] Continuation-in-part of Ser. No. 143,470, Oct. 26, 1993, Pat. No. 5,466,769.

[51] Int. Cl.$^6$ ................................................ C08G 18/28
[52] U.S. Cl. .......................... 528/73; 528/53; 528/60; 528/62; 528/68; 548/215
[58] Field of Search ........................ 528/60, 62, 68, 528/78, 94, 53, 73; 525/510, 528; 548/215

[56] References Cited

U.S. PATENT DOCUMENTS

| | | | |
|---|---|---|---|
| 3,743,626 | 7/1973 | Emmons | 260/77.5 AQ |
| 4,046,744 | 9/1977 | Jenkins | 260/77.5 AQ |
| 4,054,717 | 10/1977 | Gill et al. | 428/452 |
| 4,192,786 | 3/1980 | Shibayama et al. | 260/18 |
| 4,504,647 | 3/1985 | Zabel et al. | 528/68 |
| 4,874,805 | 10/1989 | Mülhaupt et al. | 524/188 |
| 5,104,955 | 4/1992 | Mathai | 526/323.2 |
| 5,214,086 | 5/1993 | Mormile et al. | 524/237 |
| 5,223,174 | 6/1993 | Chou et al. | 252/194 |
| 5,466,769 | 11/1995 | Chou | 528/60 |

FOREIGN PATENT DOCUMENTS 3019356  11/1981  Germany.

OTHER PUBLICATIONS

Primary Technical Data Sheet, "Zoldine RD-4 Aldimine Oxazolidine Reactive Diluent," PDS 15, 1993.

*Primary Examiner*—John C. Bleutge
*Assistant Examiner*—Randy Gulakowski
*Attorney, Agent, or Firm*—Arnold, White & Durkee

[57] ABSTRACT

The present invention provides compositions and method of using an aldimine oxazolidine compound having the formula:

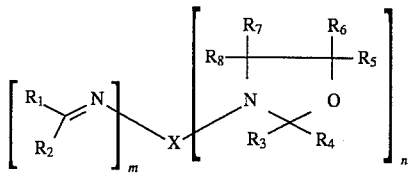

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n-valent methylene group, ethylene group, straight chain or branched chain alkylene group, cycloalkylene group, or arylene group, including any of the above X groups substituted by nitro, halogen, thiol and amino functional groups. The aldimine oxazolidine compounds are useful for improving the physical properties and improving the pot life of coatings.

15 Claims, No Drawings

ALDIMINE OXAZOLIDINES AND POLYISOCYANATES

This application is a continuation-in-part of application Ser. No. 08/143,470, filed on Oct. 26, 1993, now U.S. Pat. No. 5,466,796, issued Nov. 14, 1995.

FIELD OF THE INVENTION

The present invention is generally related to methods of using aldimine oxazolidine compounds. In particular, the present invention relates to methods of using the compounds to improve the physical properties of a preparation including resistance to weathering, impact resistance, abrasion resistance, chip resistance, salt resistance, acid resistance, organic chemical resistance, minimizing downglossing, and minimizing bubble formation. Further, aldimine oxazolidine compounds are used as a moisture scavenger and a pot life extender in a coating, sealant or adhesive.

BACKGROUND OF THE INVENTION

Polyurethane coatings are extensively used as commercial and industrial protective and/or decorative coatings. Polyurethane coatings, known in the industry as one of the toughest coatings available, are routinely applied as protective coatings on exterior walls of buildings, industrial machinery, military equipment and vehicles, commercial and passenger vehicles, and any other surface requiring a protective coating. Polyurethane systems are also used extensively as sealants and adhesives.

Protective coatings, as the name suggests, protect the surface on which it is applied from destructive environmental conditions. These conditions include exposure to ultraviolet radiation (UV), acid rain, salt, chipping agents such as stones and hail, and extremes in temperature and humidity. Protection of the substrate surfaces is particularly important in geographical areas with harsh environmental conditions. For example, in arid regions, substrates and coatings are exposed to high amounts of UV radiation. In other geographical regions, substrates and coatings are exposed to ocean spray and/or road salt, or acid rain.

A survey of the effects of environmental conditions on automotive coatings was described by David R. Bauer in *J. Coat. Tech.*, 66:835, 57–65, (1994). UV damage occurs primarily through free radical oxidation. When a coating absorbs UV radiation, a free radical is generated and combines with oxygen to produce a peroxy radical. The peroxy free radical then abstracts a hydrogen from the coating creating a carbon based radical. The hydrogen abstraction propagates until two free radicals combine in a termination step. UV damage of coatings result in loss of film properties, including loss of gloss. Ultimately, degradation of the coating is the final product of UV exposure.

In all of the diverse geographic regions, the coating must be able to withstand these environmental conditions if it is to protect the substrate. Consequently, there is a need for coatings with improved physical properties including resistance to UV radiation, impact resistance, salt resistance, acid resistance, organic chemical resistance, chip resistance, abrasion resistance, downglossing minimization, and bubble elimination.

Downglossing occurs when polyurethane coatings are applied under conditions of high humidity. This phenomenon is caused by the reaction of water with isocyanate, resulting in microbubbles on the surface of the coating which reduce gloss. Downglossing affects air dry systems more severely than forced dry or baked systems. There is a need for an agent which can minimize downglossing in coating systems.

When water reacts with isocyanate within a preparation, it forms bubbles which create pinholes within the preparation. Bubbles have been visually eliminated from the coating, improving the film integrity, by providing improved abrasion resistance and impact resistance. An agent that can minimize or visually eliminate bubble formation in a coating, adhesive or sealant is also required.

Furthermore, for a coating to be useful, it must have a reasonable pot life to provide a sufficient time for application of the coating and to provide for longer storage time. U.S. Pat. No. 4,504,647 describes aldimine oxazolidine compounds as curing agents which exhibit a long shelf life when mixed with isocyanate. However, the mixture cures very quickly into an elastic or hard polymer in the presence of water or humidity. Coatings require an adequate pot life in order to be used commercially as automotive refinish coatings and the like. Coatings such as those described in U.S. Pat. No. 4,504,647 rapidly react with water to form a gel. These coatings have a short pot life which can prevent use of the coating formulation in typical commercial applications. There is a need for methods and compositions for improving the pot life of coatings.

Polyurethane coating systems typically include a polyisocyanate or prepolymer component and/or a polyol which react to form the polyurethane film. Alternatively, a polyurethane coating can include only the polyisocyanate component or the prepolymer component. When only the polyisocyanate or prepolymer component is included, polyisocyanate or prepolymer molecules cross-react with each other and/or with moisture to form a useful coating.

As used herein, a polyisocyanate is an isocyanate polymer; a polyol is a molecule with multiple hydroxyl groups; and a prepolymer is a polyisocyanate with covalently attached polyols with excess isocyanate groups. Exemplary polyols include polyester polyol, polyether polyol and acrylic polylol. In some polyurethane coating systems, the polyisocyanate component is blocked to prevent the polyisocyanate from reacting with the polyol prematurely. Upon exposure to deblocking conditions, the blocking groups are removed and the polyisocyanate reacts with the polyol to form the useful coating. Polyurethane coating systems also include pigments, volatile organic solvents, and a variety of adjuvant components, e.g., surface active agents, dispersants, diluents, and fillers.

Moisture curing polyurethane coating systems include a polyisocyanate or a prepolymer component which reacts with atmospheric water at room temperature to form useful films. These systems also include pigments, organic solvents, and a variety of adjuvant components, e.g., surface active agents, dispersants, diluents, and fillers. Since the polyisocyanate component reacts with even trace amounts of moisture, extreme care must be taken so that the polyisocyanates do not contact water until they are applied to a surface to be coated. Water is, however, unintentionally and unavoidably introduced into the formulation process in the form of dissolved water in solvents, adsorbed and absorbed moisture on the surfaces of fillers and pigments, and atmospheric moisture. Subsequent reaction of the water with the polyisocyanate component of the system results in an irreversible reaction which will harden the product, making it unusable before it can be applied to the surface to be coated. This water must be removed in order to produce an acceptable product. The existing methods for preparing color-pigmented moisture curable polyurethane coatings require expensive equipment to dry the pigments, solvents, and fillers. In the alternative, moisture scavenging agents are added to the coating preparation or are added to the pigments, solvents and other raw materials prior to preparing the coating.

One group of moisture scavenging agents widely used to prevent moisture contamination of moisture curable polyurethane coating systems is the monomeric isocyanates. A typical monomeric isocyanate, such as p-toluenesulfonyl isocyanate (Vanchem, Inc. Lockport, Conn.), reacts with water to generate carbon dioxide and the corresponding sulfonamide, e.g., p-toluenesulfonamide. The carbon dioxide diffuses from the pigment grind during the dehydration phase as carbon dioxide gas. A disadvantage of monomeric isocyanates is that they are harmful if swallowed, inhaled, or absorbed through the skin and are extremely corrosive to the tissues of the mucous membranes, upper respiratory tract, and skin.

There is a need for a moisture scavenger which efficiently, cost effectively, and safely removes moisture from moisture curable coating systems and from any other preparation where residual water is a problem, without seriously detracting from the performance of the cured coating.

Currently, there are available commercially two types of polyurethane systems, a one component system (1-K), and a two component system (2-K). Both the 1-K and the 2-K systems are widely used in commercial applications depending upon the specific needs of the coating system.

In the two component system, the polyisocyanate and the polyol are segregated into two separate containers until use. When the two components are mixed together, the coating cures in which the polyisocyanate cross-links with the polyol to form the polyurethane coating.

In the one component system, the polyisocyanate or prepolymer and/or the polyol are both included in one package. Alternatively, the one component includes a blocked polyisocyanate and polyol in one package. To prevent premature curing, the polyisocyanate is chemically blocked or is in the form of a prepolymer. Upon exposure to deblocking conditions (moisture, heat or radiation, etc.), the blocking group is removed and the polyurethane coating cures into a film. Well known blocking groups of the polyisocyanate include diethyl malonate, 3,5-dimethylpyrazole, MEK Oxime, ε-caprolactam and 2-ethyl hexanol. While the one component system is convenient to use, the blocked polyisocyanates are either very viscous or are solids. As a result, one component polyurethane systems require large amounts of volatile organic solvents to reduce the viscosity or to solubilize the individual components. Typically, one gallon of a one component polyurethane system contains about four to five pounds of volatile organic compounds.

SUMMARY OF THE INVENTION

The present invention provides a method of improving the physical properties of a preparation by admixing with the preparation an effective amount of an aldimine oxazolidine compound having the formula:

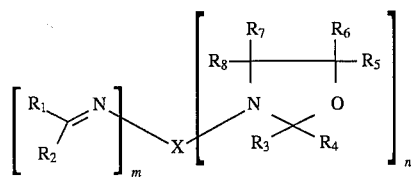

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

In one embodiment, the effective amount of an aldimine oxazolidine compound is from about 1 to about 80 weight percent of the total weight of the preparation.

The improved physical properties include resistance to weathering, impact resistance, abrasion resistance, chip resistance, salt resistance, acid resistance, organic chemical resistance, minimizing downglossing, and minimizing bubble formation. The preparation is a composite, sacrificial pigment, ink, industrial fluid, coating, adhesive, sealant, or coating component. In a preferred embodiment, the preparation is a polyurethane coating.

A second aspect of the invention provides a method of improving the pot life of a preparation. According to the method, pot life is improved by admixing an effective amount of an aldimine oxazolidine compound as described above with the preparation. Preferably, the effective amount of an aldimine oxazolidine compound is from about 1 to about 80 weight percent of total weight of the preparation.

Still another aspect of the invention provides a coating composition that includes a polyisocyanate and an aldimine oxazolidine compound as described above. The coating can also include polyol, pigment, filler, adjuvants and other components. A preferred coating is a one component polyurethane coating that includes blocked polyisocyanate, aldimine oxazolidine, and polyol. In one embodiment, the polyurethane coating is an automotive coating. In yet another embodiment, the polyurethane coating is a sprayable coating.

DETAILED DESCRIPTION OF THE INVENTION

The present invention provides an aldimine oxazolidine compound which can be advantageously used to improve the physical properties of a preparation. Preparations which are the subject of the present invention include sealants, adhesives, elastomers, epoxy resin formulations, and coatings. As used herein, a coating is any reactive coating.

In one embodiment, the present invention provides a method of improving the physical properties of the preparation comprising admixing an effective amount of an aldimine oxazolidine compound with the preparation. The physical properties of the preparation improved by the disclosed aldimine oxazolidine include resistance to weathering, impact resistance, abrasion resistance, chip resistance, salt resistance, acid resistance, organic chemical resistance, reduction in downglossing, and reduction in bubble formation. The improvements in these physical properties are disclosed in the examples below.

When polyurethane coatings are applied under conditions of high humidity, a phenomenon known as downglossing (dieback) can occur. Downglossing is caused by the reaction of humidity (water) with isocyanate, resulting in microbubbles on the surface of the coating which reduce gloss. Downglossing affects air dry systems more severely than forced dry or baked systems. The aldimine oxazolidine compounds of this invention can be used as additives for minimizing downglossing because these mixtures react with moisture more rapidly than does isocyanate.

When water reacts with isocyanate within a preparation, it forms bubbles which create pinholes within the preparation. The mixtures of this invention can also be used to minimize the formation of bubbles in a coating. Bubbles have been visually eliminated from the coating, improving the film integrity by providing improved abrasion resistance and impact resistance.

Oxazolidine compounds have been used as curing and crosslinking reagents, reacting with polyfunctional isocyanates in the presence of polyols or water to form polymeric coatings. U.S. Pat. No. 4,101,527 discloses an equimolar reaction of an oxazolidine with a polyfunctional isocyanate in the presence of water to form a polyurethane coating. U.S. Pat. No. 3,941,753 describes prepolymers for coating formation prepared from the reaction of a ketiminoalkanol with an isocyanate. However, neither of these two patents disclose the use of aldimine oxazolidines to improve the physical properties of the polyurethane coatings.

The aldimine oxazolidine compounds of the present invention have the formula:

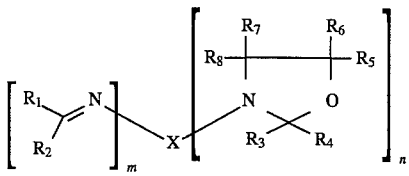

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups. All R group substituents which improve the performance of the aldimine oxazolidine compounds are preferred. The structure of the R substituents in the aldimine oxazolidines is determined by the selection of the reactant precursor compounds. In a specific embodiment of the invention, α,α-4,4-tetramethyl-2-(methylethyl)-N-(2-methylpropylidene)-3-oxazolidine ethanamine (RD-4) is prepared by reacting 2-[(2-amino-2-methylpropyl)-amino]-2-methyl-1-propanol with isobutyraldehyde.

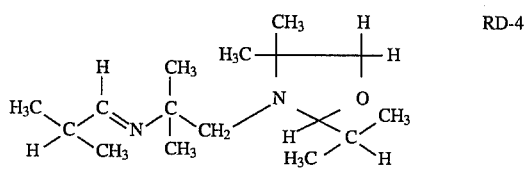

The effective amount of an aldimine oxazolidine compound to minimize downglossing or bubble formation is from about 1 to about 80 weight percent of the total weight of the preparation. Preferably, the effective amount is from about 1 to about 30 weight percent.

In another aspect, the physical properties of polyisocyanate containing coatings are improved by admixing an effective amount of an aldimine oxazolidine compound with the coating. Polyurethane coatings are available commercially as 1 component (1-K) or 2 component (2-K) coatings (see background section). These coatings are typically cured by moisture, ambient, thermal, forced dry, radiation or bake curing.

Typically, 1-K polyurethane coatings contain prepolymers and/or blocked polyisocyantes while 2-K polyurethane coatings contain polyisocyanates. An aldimine oxazolidine compound of the present invention improves the physical properties of coatings which contain polyisocyanate, blocked polyisocyanate or prepolymers.

The effective amount of an aldimine oxazolidine compound that improves the physical properties of a preparation is from about 1 to about 80 weight percent of the total weight of the preparation. Preferably, the effective amount is from about 1 to about 30 weight percent.

In still another aspect, the aldimine oxazolidine compound as disclosed herein improves the pot life of a preparation. Pot life is improved by admixing with the preparation an effective amount of an aldimine oxazolidine compound.

Pot life is the time that a preparation can be stored without gelling. Coatings require an adequate pot life in order to be useful as coatings. Example 5 describes how pot life is determined.

The effective amount of a aldimine oxazolidine compound that increases the pot life of a preparation is from about 1 to about 80 weight percent of the total weight of the preparation. Preferably, the effective amount is from about 1 to about 30 weight percent of the total weight of the preparation.

The pot life of an adhesive, sealant, elastomer, or coating is increased by the use of an aldimine oxazolidine. Preferably, the coating is a coating that contains a polyisocyanate, blocked polyisocyanate or prepolymer.

As discussed above, a one component polyurethane system includes in one pot (container) all of the components required to produce a polyurethane coating including both polyisocyanate and polyol if desired. In a 1-K system, the polyisocyanate is prevented from prematurely reacting with the polyol (or an aldimine oxazolidine) by chemical blocking groups or is in the form of a prepolymer. Thus a 1-K polyurethane system contains in one pot a blocked polyisocyanate or a prepolymer and/or polyol and adjuvant compounds. Because the blocked polyisocyanates are typically very viscous or are solids, large amounts of volatile organic solvents are required to make a one component polyurethane coating sprayable. In one aspect, part or all of the organic solvents required to prepare a polyurethane coating is replaced with an aldimime oxazolidine having the formula:

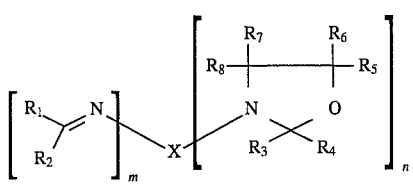

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when $R_5$, $R_6$, $R_7$ and $R_8$ are hydrogen atoms, $R_3$ and $R_4$ are not hydrogen atoms, further, $R_7$ and $R_8$ cannot simultaneously be hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

In another aspect, a polyurethane coating comprising a polyisocyanate and an aldimime oxazolidine compound is provided by the present invention. In one embodiment, the polyisocyanate is a blocked polyisocyanate. In a preferred embodiment, the polyurethane coating further includes a component selected from the group consisting of polyol, pigment, filler, adjuvant and solvent.

In a preferred embodiment, the polyurethane coating is a one-component polyurethane system or a two-component polyurethane system. In another preferred embodiment, a coating of the present invention is an automotive coating or a clearcoat. In yet another embodiment, a preferred coating is a sprayable coating.

The composition is preferably a polyurethane coating in which an effective amount of an aldimine oxazolidine compound is intimately admixed with the polyurethane formulation. An effective amount of the aldimine oxazolidine compound of the present invention is an amount sufficient to provide an acceptable pot life or stability and cure rate while maintaining or improving the film properties of the preparation. Generally, the effective amount will range from about 1 to about 80 weight percent based on the total weight of the formulation. In a preferred embodiment, the effective amount includes from about 1 to about 50 weight percent of the compound based on the total weight of the formulation. Most preferably, from about 1 to about 30 weight percent of the compound based on the total weight of the formulation is added.

The polyisocyanates of the composition include those conventionally used in forming polyurethane coatings as described in U.S. Pat. No. 3,743,626. Since the polyisocyanate component reacts with even trace amounts of moisture, extreme care must be taken so that the polyisocyanates do not contact water until the formulation is to be used. The formulation may be dehydrated prior to addition of the polyisocyanate through the use of drying equipment or moisture scavengers. Alternatively, the aldimine oxazolidine of the present invention can be used as a moisture scavenger. Alternatively, in a one-component polyurethane system, the polyisocyanate component can be a blocked polyisocyanate. Exemplary blocking groups are known and include diethyl malonate, 3,5-dimethylpyrazole, MEK Oxime, ε-caprolactam and 2-ethyl hexanol.

The solvents generally used in the formulation of specialty polyurethane systems are also compatible with the aldimine oxazolidine compounds of the present invention. Solvents generally used in the preparation of polyurethane preparations including aprotic solvents, such as ketones, esters, ethers, nitroparaffins, glycol esters, glycol ether esters, halogenated hydrocarbons, and alkyl and aromatic hydrocarbons can be added to the formulation.

Pigments, fillers, and adjuvants can be added to the coating compositions. For the purposes of this invention the term "fillers" is intended to include those nonreactive materials added to a coating preparation to increase the solids content of the coating. The term "adjuvants" is intended to include those materials which are added to the coating formulation to aid application or formation, such as surface active agents, anti-settling agents, diluents, suspending agents, dispersants, flow additives, UV inhibitors and the like.

The following examples are presented to describe preferred embodiments and utilities of the present invention and are not meant to limit the present invention unless otherwise stated in the claims appended hereto.

EXAMPLE 1

Preparation of Coatings

Clear and pigmented polyester based coatings and clear and pigmented acrylic based coatings were prepared. The ingredients listed as Component I in the tables below were combined in an air-mixer (Fawcett Co. Inc., Richfield, Ohio). After Component I was prepared, the ingredients listed as Component II were added to Component I in the same air-mixer or by hand to prepare a polyurethane coating.

TABLE 1

TWO-COMPONENT POLYURETHANE ACRYLIC CLEAR COAT

| MATERIALS | PARTS BY WEIGHT (g) | |
|---|---|---|
| | CONTROL | RD-4 |
| Component I | | |
| Acrylic Polyol | 398.6 | 303.0 |
| RD-4* | — | 48.5 |
| Wetting Agent | 18.8 | 19.5 |
| TiO$_2$ | 377.0 | 420.0 |
| Solvents | 183.5 | 153.0 |
| Component II | | |
| Aliphatic Isocyanate | 126.1 | 202.0 |
| Solids - By Weight | 71.7 | 77.9 |

*20% of resin solids replaced by RD-4.

TABLE 2

TWO-COMPONENT POLYURETHANE POLYESTER CLEAR COAT

| MATERIALS | PARTS BY WEIGHT (g) | |
|---|---|---|
| | CONTROL | RD-4 |
| Component I | | |
| Polyester Polyol | 375.3 | 280.3 |
| RD-4* | — | 53.4 |
| Wetting Agent | 15.6 | 14.6 |
| TiO$_2$ | 367.0 | 354.0 |
| Solvents | 199.5 | 156.9 |

TABLE 2-continued

TWO-COMPONENT POLYURETHANE
POLYESTER CLEAR COAT

| | PARTS BY WEIGHT (g) | |
| --- | --- | --- |
| MATERIALS | CONTROL | RD-4 |
| Component II | | |
| Aliphatic Isocyanate | 169.5 | 262.0 |
| Solids - By Weight | 73.4 | 78.0 |

*20% of resin solids replaced by RD-4.

EXAMPLE 2

Physical Properties

The physical properties of a cured coating as described herein are determined as follows.

Weatherability

The destructive action of natural outdoor weather produces changes in the properties of the coating including changes in color, texture, strength, chemical composition and loss of gloss. Weathering properties of coatings are tested by two well known standardized techniques.

Accelerated weathering tests (ASTM G-53, D-523, and D-2244) are performed on a QUV accelerated weathering tester using a UV-A lamp emitting radiation between 300 nm and 400 nm (Model QUV, Q-Panel, Cleveland, Ohio). QUV is ultraviolet radiation of 190 nm to 400 nm. A coating is applied to a metal panel and cured (dry film thickness about 2 mil). The color and gloss are measured initially and after the coating is exposed to between 2,000 hours of QUV/ condensation. Gloss retention and color retention are calculated and compared to coatings prepared without the addition of an aldimine-oxazolidine as described herein.

Tables 4 and 5 below shows the effect of RD-4 on an acrylic and a polyester based coating. As shown in table 5, after 2,000 hours of QUV/condensation exposure, when gloss was measure at 20°, a polyester based coating which did not contain RD-4 retained only about 2% of the original gloss. In marked contrast, the coating with 10% RD-4 retained 64% of the original gloss. Table 4 shows similar improvements in gloss retention at for acrylic based coatings with the indicated amounts of RD-4.

Weatherability can also be tested by exposing coatings to natural outdoor weather (ASTM D-4141, Procedure C; D-1641, Section 5; D-523 and D-2244). These procedures are carried out by exposing coated panels to southern exposure at 90°, 45°, or 5° (from ground)

Impact Resistance

Impact resistance is the ability of a coating to resist deformation upon impact. Impact resistance was tested according to ASTM D-2794. Briefly, a weighted plunger was dropped from various distances onto the front (direct) or the back (reverse) of a panel coated with a 2-K pigmented acrylic based coating of Example 1. The distance at which the plunger is dropped onto the panel is increased until the coating film is broken.

Table 3 shows these results. Coatings containing no RD-4 were damaged by 35 pounds/in$^2$ (direct impact) and less than 5 pounds/in$^2$ was required to damage the coating from the reverse impact. The addition of RD-4 increased the impact resistance of the coatings. Coatings which contain 30% RD-4 were not damaged from a direct impact until 45 pounds/in$^2$ was dropped onto the coated panel. The reverse impact strength of coatings was slightly increased by the addition of RD-4.

Abrasion Resistance

Abrasion resistance is the ability of a coating to resist being worn away. Abrasion (taber) resistance was tested according to ASTM D-4060. A 2-K pigmented acrylic based coating of Example 1 was applied to a pre-weighed panel and placed on a turntable. The turntable rotated the panel under a 1 Kg abrading wheel (CS-17) for 1,000 revolutions. The abrading wheel wears away the coating through sideslip. After 1,000 revolutions, the panel was weighed to determine the amount of loss. Table 3 shows that the addition of RD-4 improves the abrasion resistance of a 2-K coating. Coatings without RD-4 lost 78 mg while coatings with 30% RD-4 lost only 68 mg.

Chemical Resistance

Chemical resistance is the ability of a coating to resist attack by organic chemicals. Typical solvents include xylenes, toluenes, alcohols, and methyl ethyl ketone (MEK). Chemical resistance is tested according to ASTM D-4752. A coating of Example 1 is applied to a test panel and cured. The coating is then subjected to 100 double rubs with a cheesecloth which was soaked with an organic chemical.

Chip Resistance

Chip resistance is the ability of a coating or layers of coating to resist a total or partial removal from impact by hard objects such as gravel or rocks. The chip resistance of a coating of Example 1 is tested according to ASTM D-3170.

Salt Resistance

Salt resistance is the ability of a coating to resist corrosion by aqueous salt solutions such as found near oceans and on salted roads. Salt resistance is tested according to ASTM B-117. In this test, a coated and scribed panel is sprayed intermittently with an acidic acid salt solution and steam (salt spray) and incubated at 95° F. for a specified number of days. The salt resistance of the coating is determined by the amount of corrosion at the scribe and blistering observed on the panel and how quickly the corrosion and blistering occurs. The corrosion and blistering observed on a panel coated with a coating containing an iminoalcohol-oxazolidine compound is compared to a panel coated with a coating that does not contain an iminoalcohol-oxazolidine compound that has undergone similar treatment.

Acid Resistance

Acid resistance is the ability of a coating to resist attack by acids such as that found in acid rain and other acidic environmental conditions. Acid resistance is tested according to ASTM D-1308. Acid resistance is determined by exposing a coated panel to an acidic solution for a specified number of hours. The acid resistance of the coating is determined by the amount of staining and/or loss of gloss. The staining and/or loss of gloss observed on a panel coated with a coating containing an iminoalcohol-oxazolidine compound is compared to a panel coated with a coating that does not contain an iminoalcohol-oxazolidine compound that has undergone similar treatment.

TABLE 3

ACRYLIC-PIGMENTED SYSTEM
ABRASION AND IMPACT RESISTANCE

| MATERIAL | CONTROL | RD-4 (10%) | RD-4 (20%) | RD-4 (30%) |
|---|---|---|---|---|
| Taber Abrasion (mg weight loss) | 78 | 71 | 68 | 68 |
| Impact Resistance Forward/Reverse | 35/<5 | — | — | 45/5 |

TABLE 4

ACRYLIC-PIGMENTED SYSTEM
WEATHERABILITY

| MATERIAL | CONTROL | RD-4 (20%) |
|---|---|---|
| Initial Gloss | | |
| 20° | 80 | 85 |
| 60° | 87 | 88 |
| 2,000 hrs QUV Gloss | | |
| 20° | 36 | 50 |
| 60° | 69 | 73 |

TABLE 5

POLYESTER-PIGMENTED SYSTEM
WEATHERABILITY

| MATERIAL | CONTROL | RD-4 (10%) | RD-4 (20%) | RD-4 (30%) |
|---|---|---|---|---|
| Initial Gloss | | | | |
| 20° | 88 | 83 | 81 | 82 |
| 60° | 91 | 89 | 90 | 90 |
| 2,000 hrs QUV Gloss | | | | |
| 20° | 2 | 53 | 35 | 31 |
| 60° | 26 | 89 | 79 | 76 |

EXAMPLE 3

Preparation of 2-[(2-amino-2-methylpropyl)-amino]-2-methyl-1-propanol

2-Amino-2-methyl-1-propanol (AMP, 362.2 grams; 4.0 moles) was added to a 2-liter resin flask with a four neck top, equipped with a magnetic stirrer, a thermocouple, an additional funnel and a stopper at room temperature under nitrogen atmosphere. The AMP was heated to 40° C. and then solid 95% paraformaldehyde (HCHO, 127.5 grams, 4.0 moles) was added batch-wise in about five minutes. The reaction temperature rose slowly to 45° to 50° C. due to the exotherm. The resultant slurry gradually became a clear solution in about 30 minutes at this temperature. This clear solution was allowed to stir for an additional hour to complete the oxazolidine formation. 2-Nitropropane (2-NP, 337.0 grams, 3.6 moles) was added through the addition funnel to the warm oxazolidine solution dropwise over the course of about one hour in such a manner that the pot temperature was between 45° to 50° C. The resulting light yellow solution was allowed to stir for another hour at 45° to 50° C. The reaction mixture was gradually cooled to room temperature. However, in order to prevent solidification of nitro amino alcohol (NAA), 400 ml of methanol was added when the solution temperature was 30° to 35° C. The resultant solution (NAA/MeOH, 1137.6 grams) was used for hydrogenation without further purification.

A 2-liter autoclave charged with Raney nickel (A-7000, 20 grams) in 300 ml methanol was pressurized with 600 psi hydrogen and agitated at 600 rpm. The autoclave was heated to 50° C. Part of the aforementioned nitro amino alcohol (NAA, 557.4 grams) was then incrementally fed to this autoclave through a mechanical pump over a period of two hours. During the addition, the reaction temperature was maintained at 50° C. through a Parr controller. After the addition, the reaction temperature was kept under the same condition (600 psi, 600 rpm and 50° C.) for an additional hour. The resultant amino aminoalcohol/methanol solution was cooled to room temperature and filtered through a glass fiber filtering paper to remove the Raney nickel catalyst. The methanol/water filtrate of the desired amino aminoalcohol was stripped of methanol/water under ambient pressure, followed by vacuum stripping of other low boiling impurities. A viscous light yellow liquid product was obtained. This crude material was used for the oxazolidine formation without further purification.

EXAMPLE 4

Preparation of α,α-4.4-tetramethyl-2-(methylethyl)-N-(2-methylpropylidene)-3-oxazolidine ethanamine (RD-4)

The crude amino aminoalcohol (131 grams, about 90%, 0.74 mole) obtained from Example 3 was transferred to a one liter, four necked round bottom flask, equipped with a mechanical stirrer, a thermocouple, a Dean-Stark trap (20 ml capacity) with a Friedrich condenser on top, and an addition funnel under nitrogen atmosphere. The viscous liquid was heated to 40° C. and isobutyraldehyde (IBA, 152 grams, 98%, 2.06 moles) was added to this liquid over a period of thirty minutes. During this addition, the reaction temperature rose to 65° C. The resultant yellow solution was heated to reflux to remove water azeotropically. A total of 27.2 grams water was removed after about twelve hours of heating. The resultant yellow liquid was then vacuum stripped to remove excess IBA and low boilers. Further vacuum distillation (148° to 158°C., at 30 to 35 mm Hg) gave a light yellow liquid product.

EXAMPLE 5

Pot Life

Pot life is the time that a preparation can be stored without gelling. Pot life is determined by observing the viscosity of a coating at timed intervals. The time required for the viscosity increase to a predetermined level is the pot life of the sample. As used herein, pot life is defined as the increase in viscosity from an initial viscosity of 18 seconds to a viscosity of 30 seconds on a Zahn #3 cup. A coating with a viscosity of 18 seconds on a Zahn #3 cup in accordance with example 1 is prepared. The viscosity of the coating is determined every 30 minutes until a viscosity of 30 seconds is reached.

While the invention is susceptible to various modifications and alternative forms, specific embodiments thereof have been shown by way of example and were herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims. Any R group substituents which improve the physical properties of a preparation are within the scope of the present invention. Additionally, any R groups which improve the pot life of a preparation are within the scope of the present invention.

What is claimed:

1. A method of improving the pot life of a polyisocyanate composition, comprising admixing with the composition, an effective amount of an aldimine oxazolidine compound having the formula:

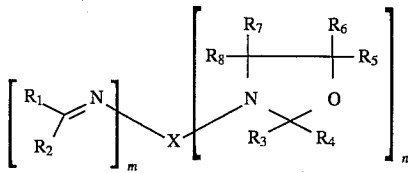

wherein: $R_1$, $R_2$, $R_3$, $R_4$, $R_5$, $R_6$, $R_7$ and $R_8$ are, individually, a hydrogen atom, a methyl or methylol group, an ethyl or ethylol group, a straight chain or branched chain alkyl or alkanol group, a cycloalkyl group, or an aryl group, including any of the above groups substituted by nitro, halogen, thiol and amino functional groups, such that when both $R_7$ and $R_8$ are hydrogen atoms, neither $R_3$ nor $R_4$ are hydrogen atoms; m and n are integers of one to three, and m+n is between two and four; and X is a covalent bond between the nitrogen atom of the aldimine group and the nitrogen atom of the oxazolidine group or an (m+n)-valent methylene group, ethylene group, straight chain or branched chain alkylene group, cycloalkylene group, or arylene group, including any of the above X groups substituted by nitro, halogen, thiol and amino functional groups.

2. The method of improving the pot life of claim 1, wherein said polyisocyanate composition is used to prepare a coating, elastomer, adhesive or sealant.

3. The method of improving the pot life of claim 1, wherein the effective amount of said aldimine oxazolidine compound is from about 1 to about 80 weight percent of the total weight of said composition.

4. The method of improving the pot life of claim 1, wherein the effective amount of said aldimime oxazolidine compound is from about 1 to about 50 weight percent of the total weight of said composition.

5. The method of improving the pot life of claim 1, wherein the effective amount of said aldimine oxazolidine compound is from about 1 to about 30 weight percent of the total weight of said composition.

6. The method of claim 1 wherein $R_1$–$R_4$ are alkyl groups.

7. The method of claim 6 wherein at least one of $R_1$–$R_4$ is a methyl group.

8. The method of claim 6 wherein at least one of $R_1$–$R_4$ is an ethyl group.

9. The method of claim 1 wherein $R_5$ and $R_6$ are alkyl groups.

10. The method of claim 9 wherein at least one of $R_5$ and $R_6$ is a methyl group.

11. The method of claim 9 wherein at least one of $R_5$ and $R_6$ is an ethyl group.

12. The method of claim 1 wherein X is an (m+n)-valent alkylene group.

13. The method of claim 12 wherein X is an (m+n)-valent methylene group.

14. The method of claim 12 wherein X is an (m+n)-valent ethylene group.

15. The method of claim 1 wherein $R_1$ and $R_4$ are isopropyl groups, $R_2$, $R_3$, $R_5$, and $R_6$ are hydrogen, $R_7$ and $R_8$ are methyl groups, X is an isobutyl group, and m and n are 1.

* * * * *